United States Patent

[11] 3,568,879

[72] Inventor Theodor Box
 1108 Ailene Road, Brielle, N.J. 08750
[21] Appl. No. 804,145
[22] Filed Mar. 4, 1969
[45] Patented Mar. 9, 1971

[54] PLASTIC STACKING AND TRANSPORT CASE
 4 Claims, 7 Drawing Figs.
[52] U.S. Cl. .................................................. 220/97,
 220/72, 220/23.6
[51] Int. Cl. ...................................................... B65d 21/02,
 B65d 1/22
[50] Field of Search ........................................... 220/21,
 23.6, 72 (U), 74 (T), 97 (D), 66

[56] References Cited
 UNITED STATES PATENTS
 3,282,462 11/1966 Box .............................. 220/97X
 3,333,727 8/1967 Belcher .......................... 220/21X FOREIGN PATENTS
 1,404,289 5/1965 France ......................... 220/23.6

Primary Examiner—George E. Lowrance
Attorney—Karl Rath

ABSTRACT: An integrally molded oblong rectangular plastic transport case having a length-to-width ratio greater than 1 and less than 1.5 has its bottom wall formed with two rows of three spaced and aligned framelike outward extensions each, said rows being symmetrical to the lengthwise center line of said wall, to provide a single lengthwise channel intersected by two crosswise channels of a width in excess of twice the width of the upper edges of the side and end walls of the case. The center lines of each of the crosswise channels are spaced from the short sides of said bottom wall such as to enable crosswise stacking and mutual interlock of tiers each including a plurality of cases. The spaces within the extensions near the corners of said bottom wall include gridlike structures flush with their outer surfaces, to provide discrete bearing surfaces for the wheels of a gravity conveyor used for loading and unloading of the cases.

INVENTOR
THEODOR BOX
BY
KARL RATH
ATTORNEY

INVENTOR
THEODOR BOX
BY
KARL RATH
ATTORNEY

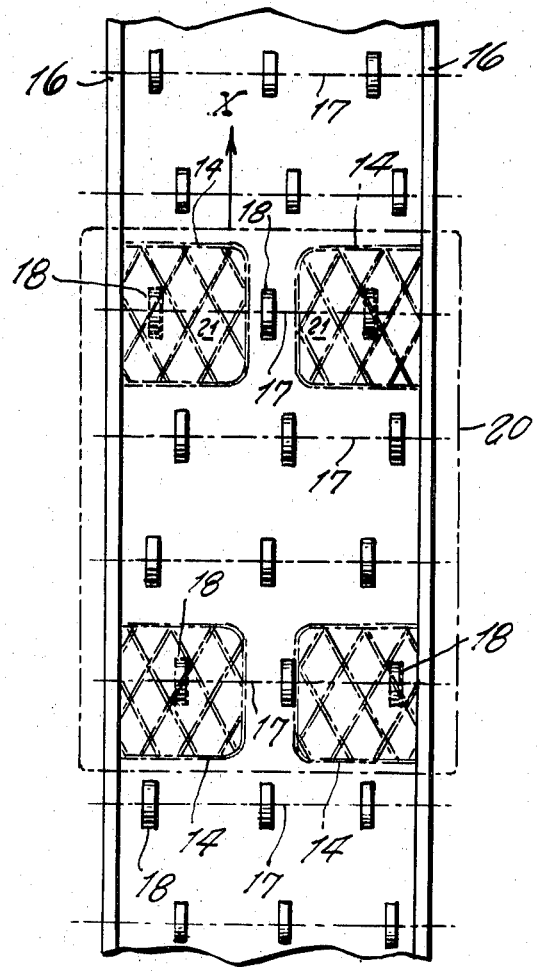
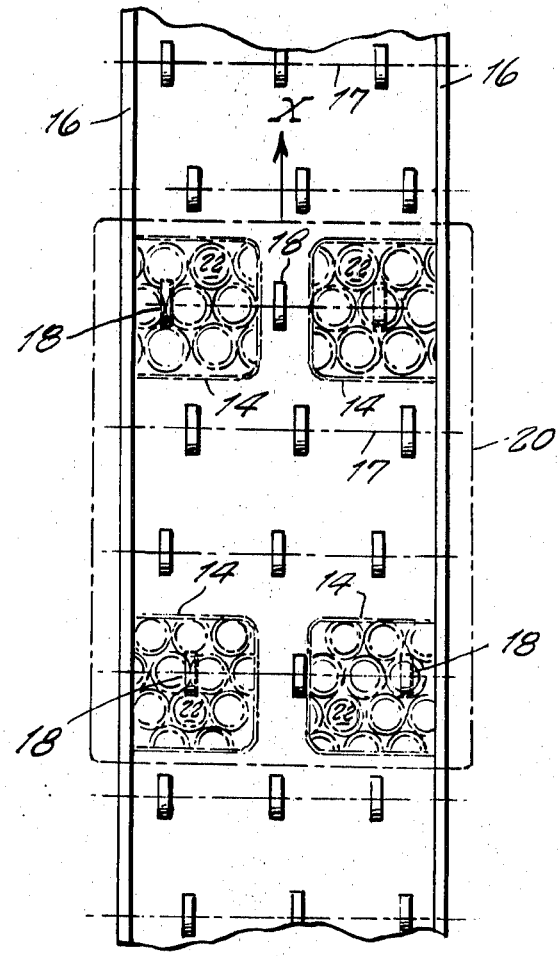

PLASTIC STACKING AND TRANSPORT CASE

The present invention relates to transport cases, more particularly though not limitatively, to cases of the type integrally molded from a synthetic high impact plastic material, such as polyethylene, polypropylene, polyvinyl chloride and the like, as commonly used for the storage and shipment of packaged goods, including bottles, cartons and the like containers employed in the distribution of beverages and other food products.

An important problem in the use of transport cases of this type is the safe and expeditious stacking of a greater numbers of cases during both storage and transport. While there are already known plastic cases especially designed for stacking with the individual units of a stack being mutually interlocked with each other, to provide a stack of high mechanical stability, as shown by and described in U.S. Pat. No. 3,214,057 in the name of the present applicant, the prior construction has been found deficient in certain respects, due primarily to the difficulty to ensure a safe and instant interlock of the cases, while being assembled into a stack, on the one hand, and to enable an instant and ready disengagement of the cases during withdrawal from or disassembly of the stack, on the other hand.

An important object of the present invention is, therefore, the provision of an improved and easily stackable transport case of the referred to type, which while ensuring a practically instant mutual interlock of the cases being assembled into a stack, will enable a safe and substantially instant withdrawal of the cases for removal during the disassembly of the stack.

A more specific object of the invention is the provision of a readily stackable plastic transport case of the referred to type which, upon being stacked or placed upon the cases below in a stack being assembled, will automatically align itself to a position of ready interlock with the lower cases, to result in a final stack or assembly of desired rigidity or stability.

Still another object of the invention is the provision of a readily stackable oblong plastic transport case of the referred to type having a bottom wall provided with guide and interlocking extensions, to enable stacking and nesting of two or more cases in both relatively aligned and crosswise positions with a minimum increase of bulk and weight of the cases.

Another design requirement in the practical use of transport cases of the referred to general type, aside from enabling a ready and safe stacking, derives from the relatively simple and economical transport of the cases, in particular during loading and unloading, by means of conventional wheel conveyors of the type comprising a plurality of equispaced cross-rods mounted upon a pair of side bars like the rungs of a ladder each carrying rows of spaced and freely rotatable skate wheels, with the wheels of alternate rows being staggered or relatively displaced laterally, to provide a bearing surface for the supporting and displacing of the cases by rolling friction with said wheels either by gravity or by manually or otherwise displacing the cases along the conveyor during a loading or unloading operation.

Skate wheel conveyors of this type have the advantage over the alternative roller type conveyor, utilizing through-going rollers extending over the entire width of the conveyor of greatly reduced weight and cost, two factors of prime importance in the use of loading and unloading transport devices for cases of the type according to the invention.

On the other hand, both types of conveyors have the disadvantage that, unless the wheels or rollers are manufactured and mounted to extremely close tolerances and, furthermore, unless the bottom of the cases has a perfectly smooth or plane surface, external impact, vibratory and other interfering forces are likely to result in the cases being deviated from their proper course of alignment with the conveyor or eventually completely ejected from the conveyors, whereby to require continued supervision and manual return of the cases to a position of alignment with the conveyors.

The foregoing difficulties are of an especially serious nature for stackable cases of the type according to the present invention, in that the special design or construction to effect a mutual interlock during stacking is likely to interfere with the safe and steady support of the cases by the wheels of a conveyor of the referred to type, involving thereby, aside from the dangers outlined, the added drawback and difficulty of an interlock of the conveyor wheels with the extensions upon the bottom wall of the cases. This, in turn, may result in the interruption of the transport operation and possible damage to both the cases and conveyors.

Accordingly, yet another object of the invention is the provision of an improved transport case of the referred to type which, while enabling ready and effective interlock of the cases during assembly into a stack, is designed in such a manner as to enable its safe transport by means of a wheel-type conveyor of the type referred to, substantially without the prior and related difficulties.

The invention, both as to the foregoing and ancillary objects as well as novel aspects thereof, will be better understood from the following detailed description, taken in conjunction with the accompanying drawings forming part of this disclosure and wherein:

FIG. 4 is a bottom view of a wheel conveyor shown in conjunction with the especially designed bottom of a case according to the invention;

FIG. 6 is a view similar to and showing a modified construction of the case shown in FIG. 4.

Like reference numbers denote like parts throughout the different views of the drawings.

With the foregoing objects in view, the invention involves generally the provision of a plastic transport case of the referred to type having its outer bottom wall surface formed with two rows of three spaced and aligned rectangular framelike extensions each, to provide a single lengthwise guide and interlocking channel intersected by a pair of cross channels bounded by the inner sides of the rectangles, said lengthwise channel being symmetrical with the centerline of said bottom wall and said cross channels being located and spaced from the short sides of said bottom wall in such a manner as to enable an easy and practically instant interlock of the cases while being assembled into a stack. For the latter purpose, the guide channels have a width sufficiently in excess of twice the width of the upper edges of the side and end walls of the case extending at right angles from said bottom wall, to enable a ready and expeditious assembly as well as disassembly of the multiple stacks, in a manner as will become further apparent as the description proceeds in reference to the drawings.

Figure 1:
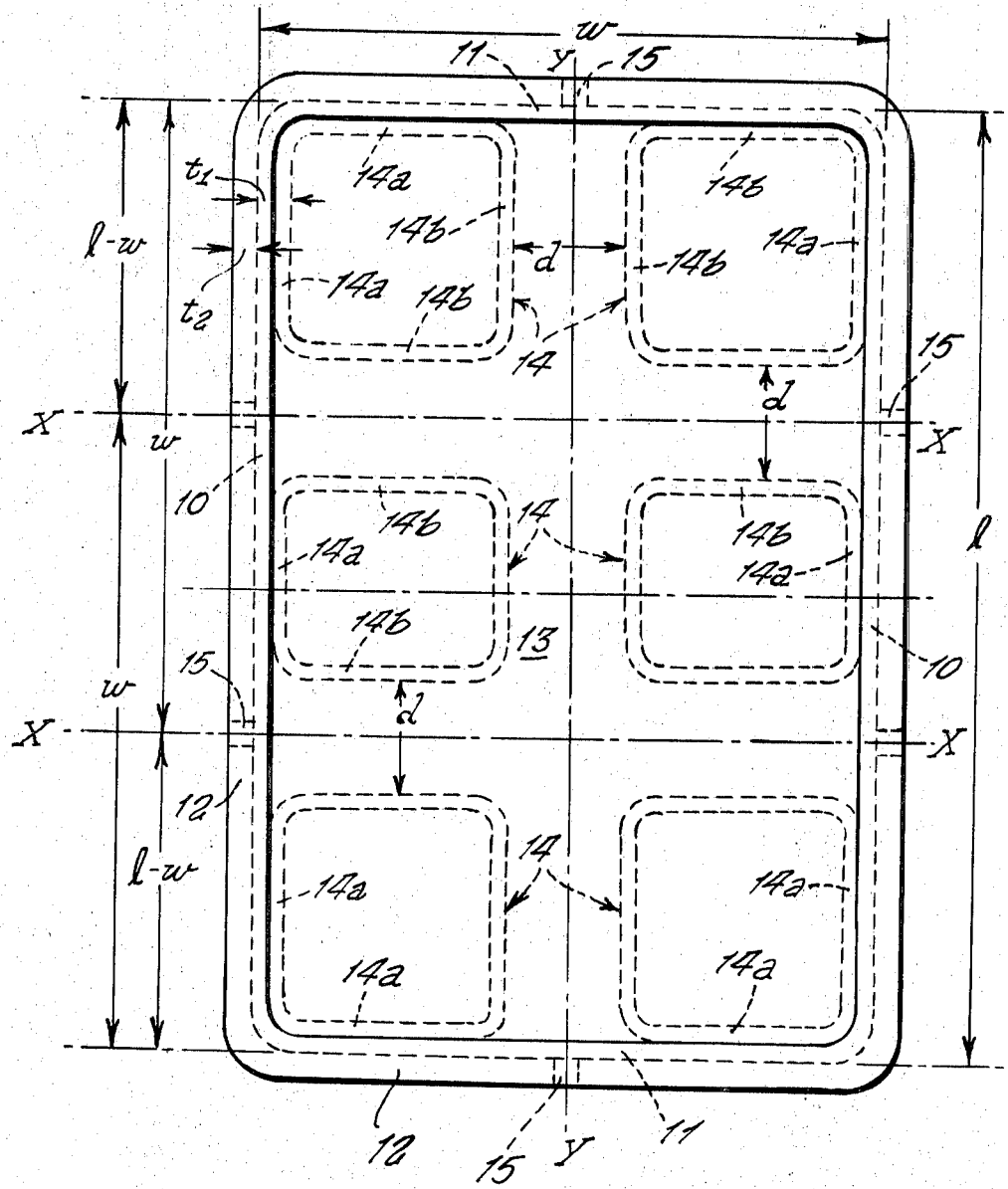
FIG. 1 is a plan view of a stackable transport case having an open top and a bottom wall constructed in accordance with the principles of the invention.
Figure 2:
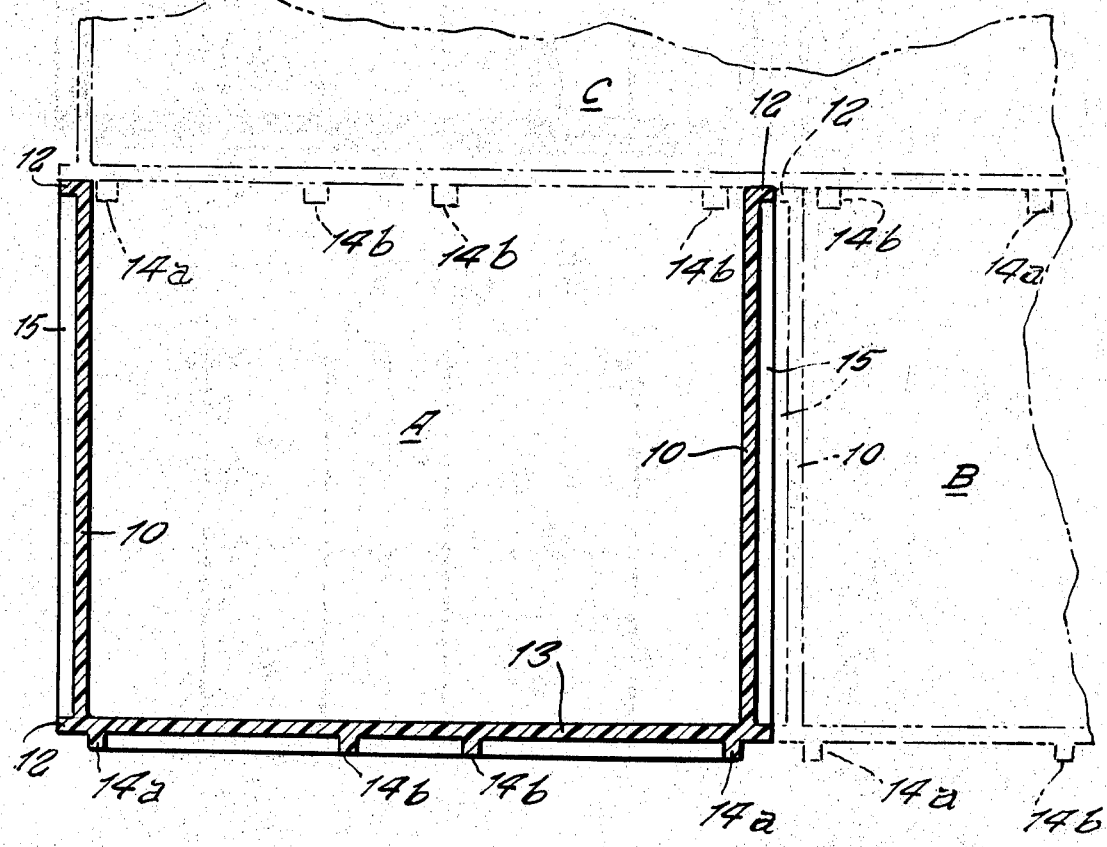
FIG. 2 is a sectional view taken on line 2—2 of FIG. 1 and including a pair of adjoining cases shown in dot-dash lines, to illustrate the interlocking effect during stacking.

Referring more particularly to FIGS. 1 and 2, the oblong rectangular transport case shown comprises a pair of sidewalls 10 of length $l$, a pair of end wall of width $w$ and a bottom wall 13, said walls having a minimum thickness $t_1$, to reduce weight and cost and being provided with upper and lower outward flanges 12 of width $t_2$ connected through vertical reinforcing ribs 15, to improve the rigidity and mechanical stability of the case.

The outside surface of the bottom wall 13 is provided, according to the improvements of the present invention, with two rows of three spaced and aligned rectangular framelike extensions 14 each, said rows being symmetrical to the lengthwise centerline y–y of said wall and having their inner portions or sides 14b spaced in both the lengthwise and crosswise directions by a predetermined distance d, in such a manner as to provide a single lengthwise channel intersected by a pair of cross channels bounded by the inner sides 14b of the rectangles 14. The center lines x–x of both cross channels are spaced from the short ends or sides of the bottom wall 13 by distances equal, respectively, to the width w and the difference l–w between the length and width of said bottom wall, while the outer sides or surfaces of the sides or portions 14a of the extensions 14 substantially coincide with the inside surface of the adjoining side and end walls 10 and 11, respectively.

More specifically, the width d of the channels, serving as guide and interlocking means for the cases as more clearly described in the following, is in excess of twice the wall thickness $t_1$ where no outward flange 12 is provided, and in excess of $2(t_1+t_2)$ in the example illustrated, respectively.

The extensions 14 preferably have a square-shaped cross section as shown of a dimension equal to the wall thickness $t_1$.

A case as described in the foregoing may be stacked in a known manner upon and in relative aligned position with another similar case with the outer portions 14a of the projections 14 nesting with the open upper edges of the side and end walls 10 and 11 of the case below in the stack. Besides, a case as described may be stacked upon and locked with one or more similar cases crosswise fashion for the assembly of multiple stacks of mutually interlocked cases and increased mechanical stability, in the manner indicated in dot-dash lines in FIG. 2. In the latter, A and B are two cases placed side by side with their sidewalls 10 adjoining one another and C is a third case stacked in crosswise fashion upon the cases A and B with its extensions 14 nesting and locking with the upper edges of the cases A and B. More specifically, the outer portions 14a at or near the short ends of the case nest with the sidewall 10, while the inner portions 14b of one of the cross channels of case C interlock with both the upper sidewall edges and flanges 12 of cases A and B in the example illustrated, thus enabling stacking and interlocking of a plurality of cases in a multiple stack, as shown by way of example by FIG. 3. The channels formed by the portions 14b of the extensions 14 having an adequate width d act both as guide and interlocking means in enabling a ready and expeditious stacking and interlock of the cases, substantially without canting or jamming of the cases during assembly as well as disassembly of the stack.

Figure 3:
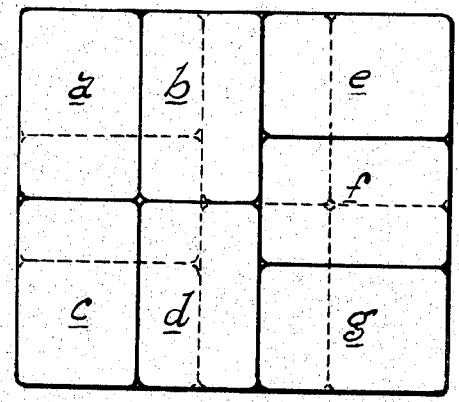
FIG. 3 is a diagrammatic view showing by way of example a multiple stack of a greater number of transport cases according to the invention.
Figure 2A:
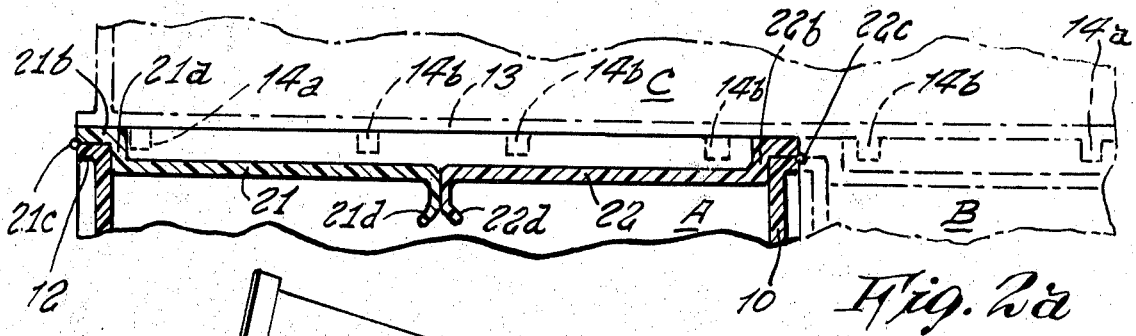
FIG. 2a is a fragmentary view of FIG. 2 illustrating the invention as applied to a case fitted with a cover in the closed position.

FIG. 3 shows diagrammatically a preferred stacking arrangement according to the invention, comprising multiple tiers of seven cases each of the type constructed in the manner described with the cases or units of adjacent tiers of the stack being mutually interlocked, to provide a composite stack of great rigidity and mechanical stability. More specifically, in FIG. 3 four units or cases a, b, c, d of each tier, as shown in solid lines in the drawing, are placed side by side in two rows of two cases each, to form a first oblong rectangular subassembly and the remaining three cases e,f,g are placed side by side in a single row with their sidewalls adjoining one another, to form a second subassembly e,f,g arranged with its longer side adjoining one of the longer sides of the subassembly a,b,c,d. This results in a final assembly a,b,c,d,e,f,g, as shown in FIG. 3. With the sides or positions of the subassemblies a,b,c,d and e,f,g, respectively, in the stack being alternately reversed from tier to tier, as indicated by the dotted lines in the drawing, the cases of one tier of the stack will be firmly interlocked with the cases of the adjacent tiers, in the manner shown and understood from FIGS. 2 and 3.

Where the length-to-width ratio of the cases is exactly equal to 1:1.5 as shown in the drawing, the result is a composite stack having its entire inner spaced occupied by the cases. On the other hand, if the length-to-width ratio is less than 1:1.5, an open space will be left in the center of the stack, without however affecting the mutual interlock of the cases.

Where the cases are provided with a cover, the latter is advantageously constructed in the form of a tray or dish as shown in FIG. 2a, to enable stacking and interlock of the cases in accordance with the invention. Thus, in FIG. 2a the cover consists of two rectangular parts having inner or central positions 21 and 22 provided with right-angular shoulders 21a and 22a at their outer edges and flanges 21b and 22b extending outwardly from said shoulders parallel to the cover portions 21 and 22, respectively. The flanges 21b and 22b are hinged to the flange 12 of the case, as at 21c and 22c, and the inner meeting ends 21d and 22d of the cover portions 21 and 22 are suitable curved inwardly, to enable closure and opening of the cover with snap action, in the manner described in greater detail in U.S. Pat. No. 3,282,462 in the name of the present applicant. In this case, the width d of the guide and interlocking channels provided by the portions 14b of the extensions 14 should have a width in excess of twice the width of the flanges 21b and 22b of the cover 21, 22, to facilitate both stacking and removal of the cases in the manner described.

Referring to FIG. 4, there is shown schematically a bottom view of a conventional wheel-type conveyor as used for loading and unloading of a case 20 according to the invention, said conveyor comprising a pair of side bars or rails 16 connected through spaced cross-rods or axes 17 arranged like the rungs of a ladder and serving to rotatively support rows of spaced skate wheels 18, with the wheels of one row being displaced laterally relative to the wheels of the adjacent rows, in the manner shown. With the conveyor placed at a proper incline angle, loading and unloading of the cases may be effected by gravity and rolling friction between the wheels and the bottom of the case 20, in a manner well known.

With transport cases constructed according to the present invention, the problem exists of canting of the cases and their getting locked by the wheels 18 of the conveyor engaging the inside spaces of the extensions 14, thereby not only interrupting the conveying operation but involving the danger of damage to both the conveyor and cases, respectively.

In order to avoid the foregoing difficulty in a most simple and economical manner, the inner spaces enclosed by the extensions 14 near the corners of the case are fitted with gridlike structures 21 being substantially flush with the edge surfaces of said extensions and having a suitable mesh size related to the dimensions of the wheels 18, in such a manner as to provide discrete bearing surfaces in contact with said wheels substantially without the likelihood of locking of the wheels with the bottom of the case. In other words, the interstices of the structure 21 are of such a size as to prevent locking with one of the wheels 18, on the one hand, while providing an adequate and stable bearing surface, to ensure a smooth running of the cases by rolling friction, on the other hand.

Advantageously, the grid structures 21 are of diamond shape as shown in FIG. 4 and so related to the dimensions of the wheels 18, as regards the size of the diamonds and thickness of the intersecting diamond walls, as to cause at any time about one half of the wheels to engage with intersecting walls of said structure being inclined with the axis of the conveyor or direction of movement X, in one direction, and to cause the remaining half of the wheels to engage with intersecting walls of said structures inclined in the opposite direction relative to the conveyor axis, as indicated and shown in FIG. 4. This results in an automatic alignment of the cases independently of impact, vibratory and other outside interfering forces tending to deviate the cases from their proper course or alignment with the conveyor.

Figure 5:
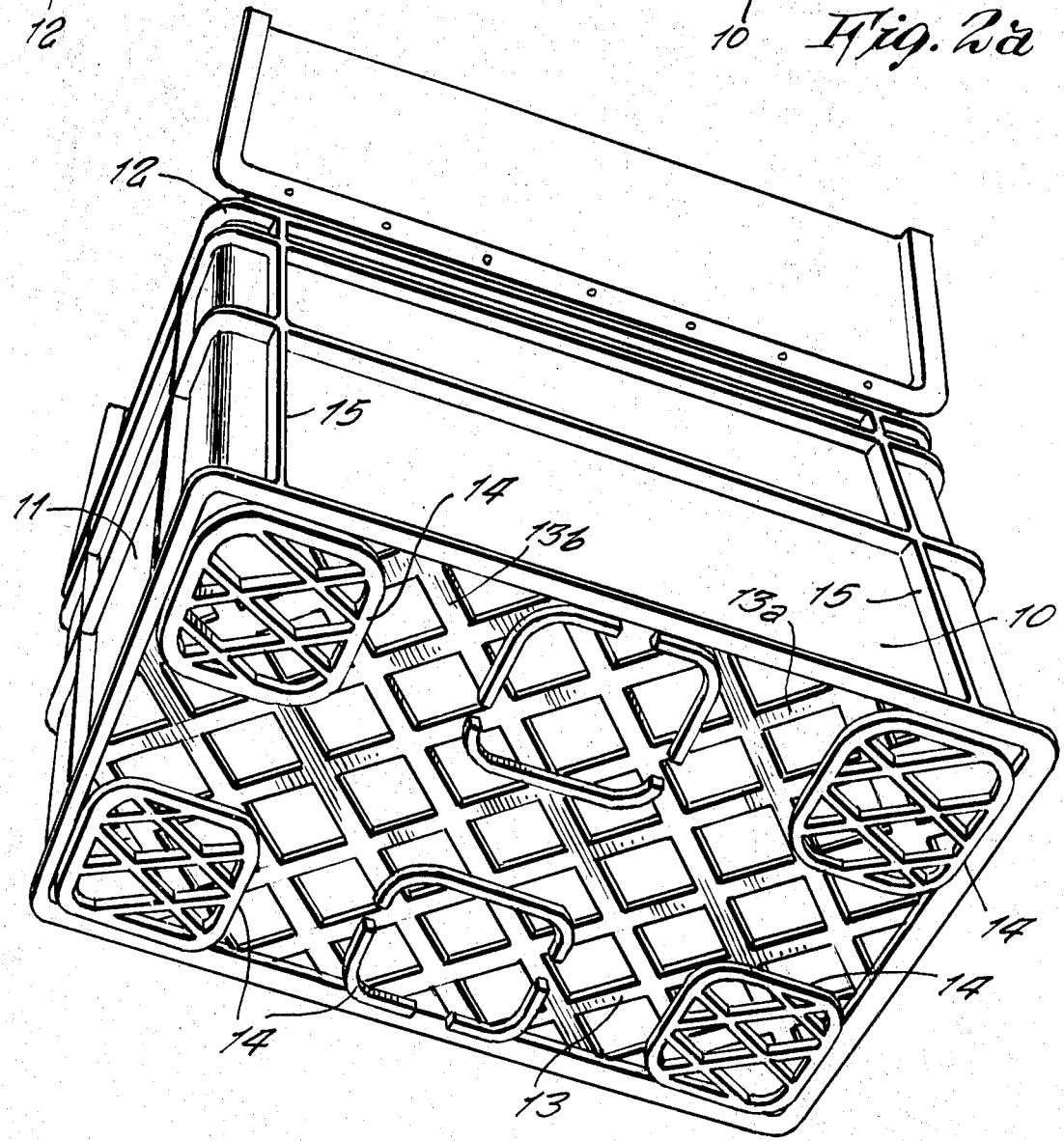
FIG. 5 is a perspective view showing the improved bottom construction according to the invention, to enable both ready stacking and interlock of two or more cases and displacement by means of a wheel-type conveyor, respectively.

FIG. 5 is a perspective view of a preferred construction of the transport case according to the invention, having a perforate bottom wall 13 in the form of a grid or lattice structure, to reduce weight and cost. In this case, the projections 14 and grid structures 21 are integrally molded with the meshes of the bottom wall or grid, in the manner shown.

In place of the diamond-shaped grid structures according to FIG. 4, any other suitable design may be employed adapted to provide discrete bearing surfaces on the one hand, and to effect an automatic alignment of the cases, on the other hand.

As an example, FIG. 6 shows a grid or mosaic structure consisting of intersecting rows of circular meshes 22 occupying the inner spaces of the extensions 14.

In the foregoing the invention has been described in reference to an illustrative and exemplary device. It will be evident, however, that variations and modifications as well as the substitution of equivalent parts for those shown herein for illustration may be made without departing from the broader scope and spirit of the invention.

I claim:

1. An integrally molded plastic stacking and transport case adapted for assembly and mutual interlock with a number of similar cases in a stack as well as for transport by a wheel conveyor of the type comprising a plurality of equispaced cross rods mounted on side bars and carrying rows of freely rotatable supporting wheels, said case comprising:
   1. a rectangular bottom wall having a length-to-width ratio greater than 1 and less than 1.5;
   2. side and end walls extending at right angles from said bottom wall;
   3. two rows of spaced and aligned rectangular framelike extensions of substantially rectangular cross section and projecting outwardly from said bottom wall, each said rows comprising three extensions equally spaced from the lengthwise centerline of said bottom wall, to provide a lengthwise channel intersected by a pair of cross-channels bounded by the inner walls of said extensions;
   4. said channels having equal widths in excess of twice the thickness of the upper edges of said side and end walls;
   5. the outer sidewalls of said extensions being aligned with the inside surfaces of the adjoining side and end walls of the case and the centerlines of each of said cross-channels being spaced from the opposite short sides of said bottom wall by distances equal to the width of said bottom wall and to the difference between the length and width of said bottom wall, respectively; and
   6. supporting means within the extensions adjoining the corners of said bottom wall, to provide discrete bearing surfaces for the wheels of said conveyor flush with the outer surfaces of said extensions.

2. A plastic case as claimed in claim 1, wherein said supporting means consists of a gridlike structure having interstices of a size to prevent interlocking with the wheels of said conveyor.

3. A plastic case as claimed in claim 1, wherein said supporting means consists of a gridlike structure composed of two sets of intersecting extension walls forming angles with the longitudinal center line of said bottom wall, to provide diamond-shaped interstices of a size to prevent interlocking with the wheels of said conveyor.

4. A plastic case as claimed in claim 1, wherein said supporting means consists of adjoining rows of adjoining circular extension walls of a size to prevent interlocking with the wheels of said conveyor